(12) United States Patent
Suzuki

(10) Patent No.: US 10,791,305 B2
(45) Date of Patent: Sep. 29, 2020

(54) IMAGE PROCESSING APPARATUS AND IMAGE PROCESSING METHOD

(71) Applicant: SONY CORPORATION, Tokyo (JP)

(72) Inventor: Takaaki Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/482,379

(22) PCT Filed: Feb. 14, 2018

(86) PCT No.: PCT/JP2018/004981
§ 371 (c)(1),
(2) Date: Jul. 31, 2019

(87) PCT Pub. No.: WO2018/159287
PCT Pub. Date: Sep. 7, 2018

(65) Prior Publication Data
US 2020/0007833 A1 Jan. 2, 2020

(30) Foreign Application Priority Data
Feb. 28, 2017 (JP) .................. 2017-036804

(51) Int. Cl.
*H04N 9/31* (2006.01)
*G06T 5/00* (2006.01)
(52) U.S. Cl.
CPC ........... *H04N 9/3179* (2013.01); *G06T 5/003* (2013.01)
(58) Field of Classification Search
CPC ........ H04N 9/3182; H04N 9/31; H04N 9/317; H04N 9/3179; G06T 5/003; G06T 5/001

USPC .................. 348/744–747, 806, 807; 382/274
See application file for complete search history.

(56) References Cited

U.S. PATENT DOCUMENTS

| 2008/0231818 A1 | 9/2008 | Shinozaki |
| 2009/0161091 A1 | 6/2009 | Yamamoto |
| 2011/0273674 A1 | 11/2011 | Ishida |

(Continued)

FOREIGN PATENT DOCUMENTS

| CN | 101271256 A | 9/2008 |
| CN | 102236243 A | 11/2011 |
| CN | 107409192 A | 11/2017 |

(Continued)

OTHER PUBLICATIONS

International Search Report and Written Opinion of PCT Application No. PCT/JP2018/004981, dated Apr. 24, 2018, 10 pages of ISRWO.

*Primary Examiner* — Sherrie Hsia
(74) *Attorney, Agent, or Firm* — Chip Law Group

(57) ABSTRACT

This disclosure relates to an image processing method, an image processing method, and a program for easily correcting a defocus blur. A defocus blur conversion section sets an appropriate amount of defocus blur by referencing a database in accordance with current lens conditions of a projector (zoom/shift/focus). A defocus blur correction signal processing section generates, through signal processing, a corrected image in accordance with the defocus blur amount from the defocus blur amount conversion section in such a manner that an input image coincides with an output image. This disclosure can be applied, for example, to an image processing apparatus, an image encoding apparatus, an image decoding apparatus or the like.

11 Claims, 14 Drawing Sheets

(56) References Cited

U.S. PATENT DOCUMENTS

2015/0172547 A1* 6/2015 Wang ..................... G06T 5/003
348/208.4

FOREIGN PATENT DOCUMENTS

| EP | 1972995 A1 | 9/2008 |
| EP | 2385408 A1 | 11/2011 |
| JP | 2006-145613 A | 6/2006 |
| JP | 2008-131099 A | 6/2008 |
| JP | 2008-233550 A | 10/2008 |
| JP | 2009-156646 A | 7/2009 |
| JP | 2011-237482 A | 11/2011 |
| JP | 2017-032891 A | 2/2017 |
| WO | 2016/147888 A1 | 9/2016 |
| WO | 2016/157670 A1 | 10/2016 |

* cited by examiner

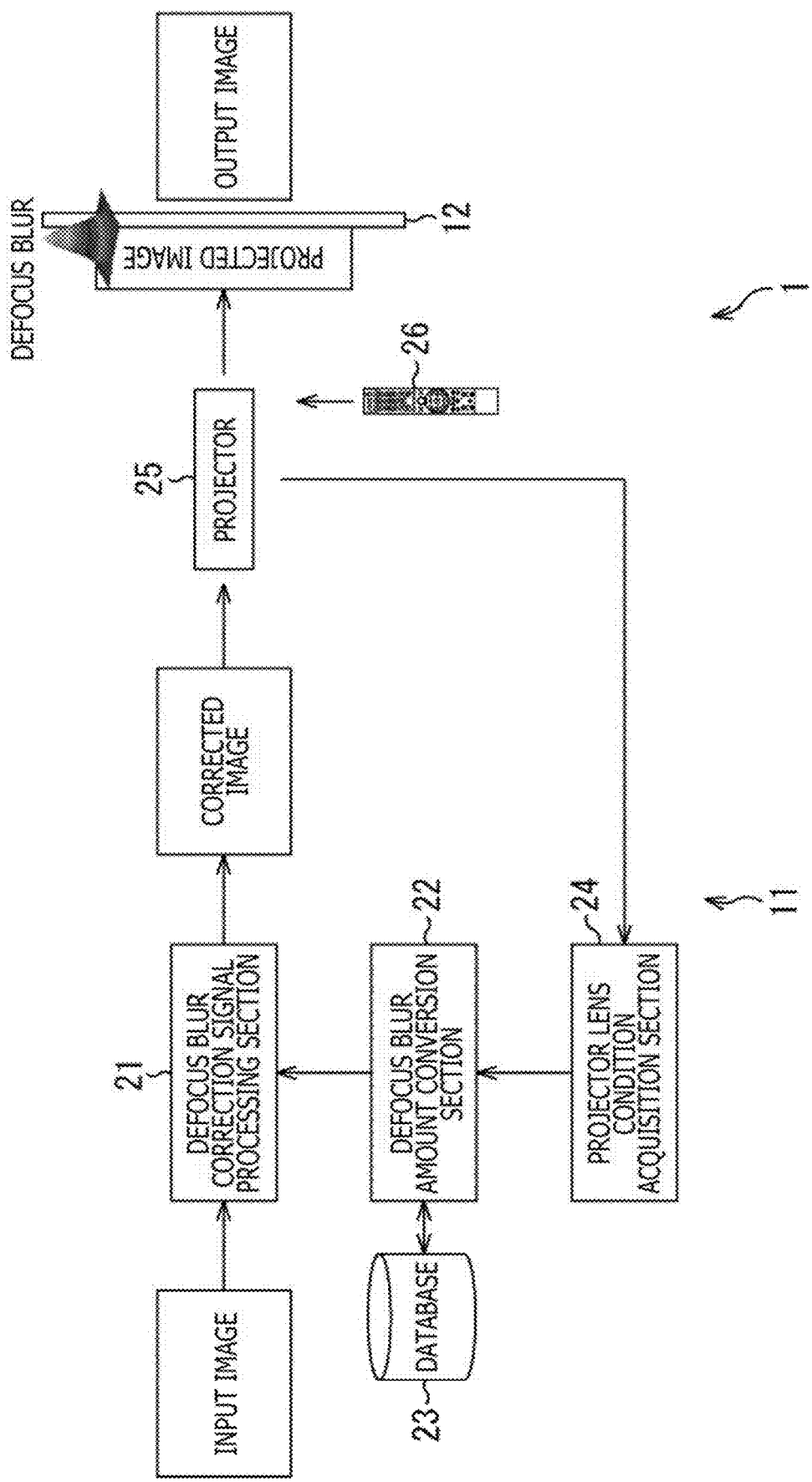

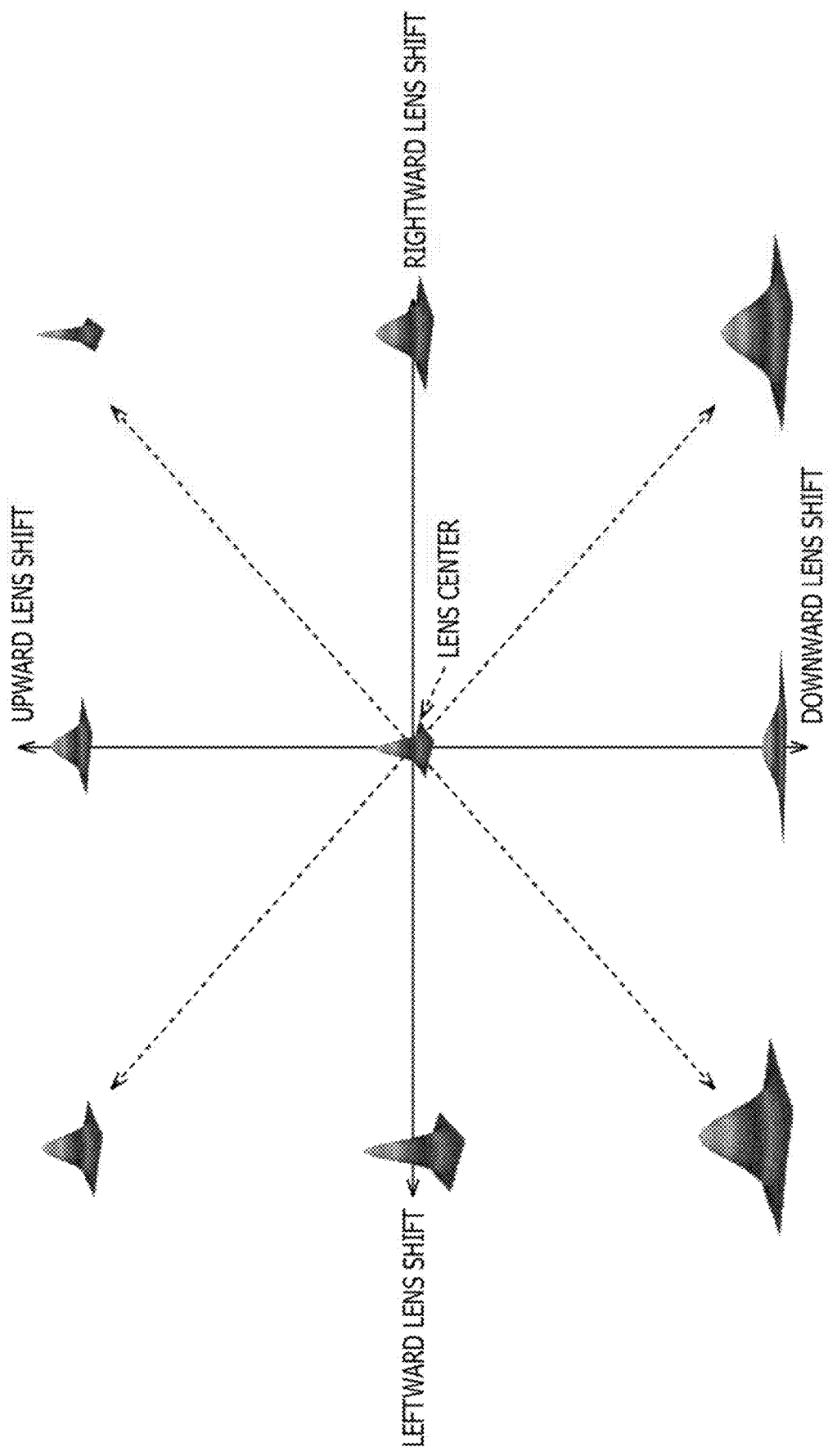

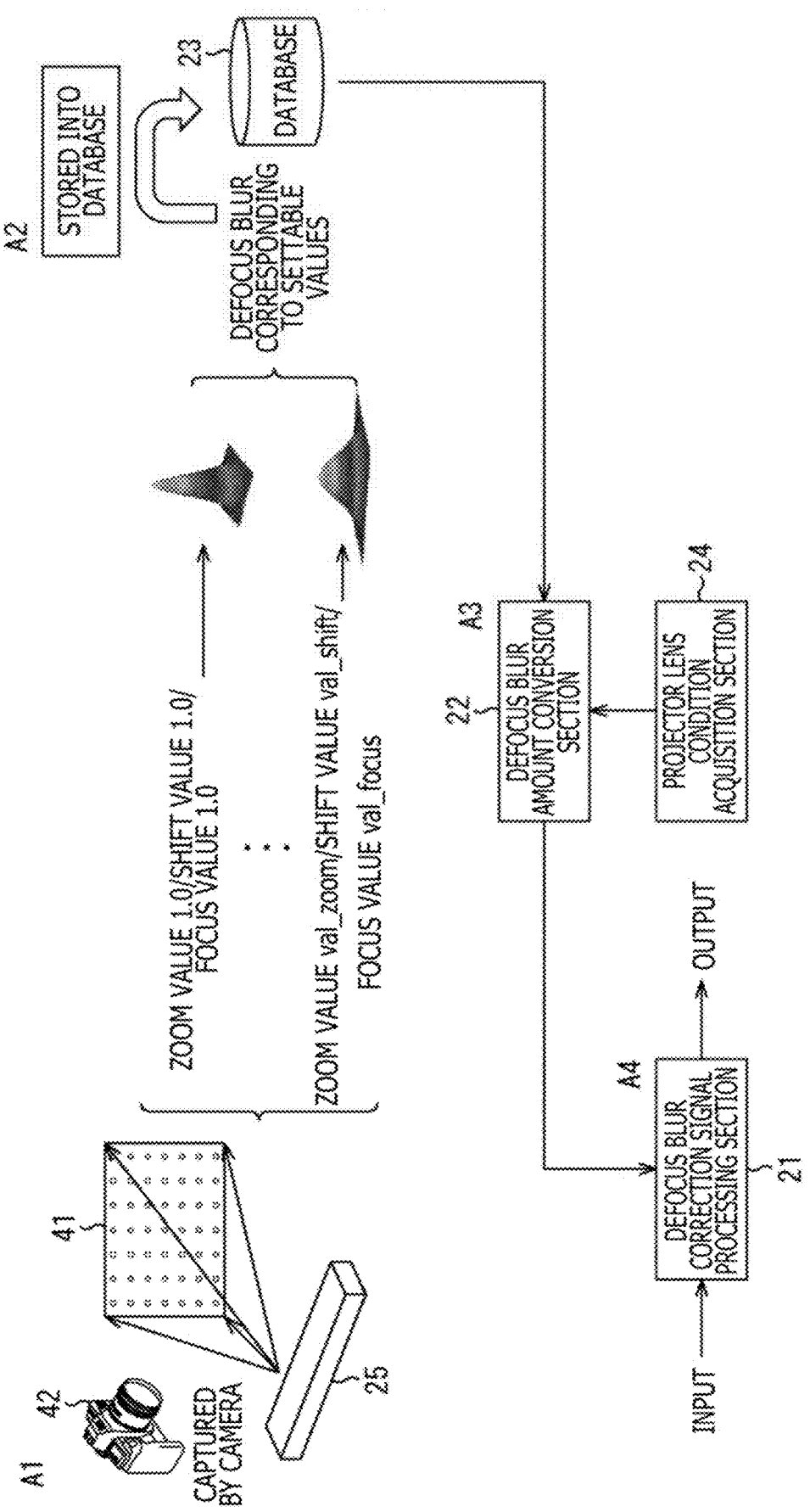

FIG. 4

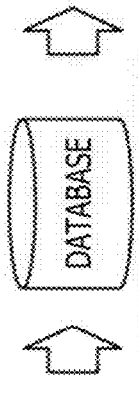

THE DEGREE OF DEFOCUS BLUR IS MODELED USING σa, σb and θ.

σa : MAJOR AXIS
σb : MINOR AXIS
θ : ANGLE

AN EXHAUSTIVE DATABASE IS CREATED BEFOREHAND USING COMBINATIONS OF σa, σb and θ.

EXAMPLE

σa : 0.0 : 0.2 : 2.0
σb : 0.0 : 0.2 : 2.0    } 66 TYPES
θ : −85 : 5 : +90

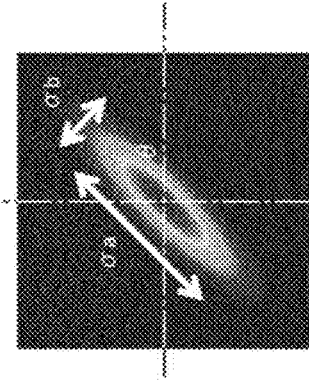

VALUES OF σa, σb and θ ALONE ARE STORED.

AT THE TIME OF IMAGE CORRECTION, THE DEGREE OF DEFOCUS BLUR IS CALCULATED FROM THE VALUES OF σa, σb and θ.

THE DATABASE MAY STORE NOT DEGREES OF DEFOCUS BLUR BUT CORRECTION VALUES FROM THE START.

IMAGE PROCESSING APPARATUS AND IMAGE PROCESSING METHOD

CROSS REFERENCE TO RELATED APPLICATIONS

This application is a U.S. National Phase of International Patent Application No. PCT/JP2018/004981 filed on Feb. 14, 2018, which claims priority benefit of Japanese Patent Application No. JP 2017-036804 filed in the Japan Patent Office on Feb. 28, 2017. Each of the above-referenced applications is hereby incorporated herein by reference in its entirety.

TECHNICAL FIELD

The present disclosure relates to an image processing apparatus, an image processing method, and a program. More particularly, the disclosure relates to an image processing apparatus, an image processing method, and a program for easily correcting a defocus blur.

BACKGROUND ART

Video image display systems involving a projector are often subject to a defocus blur occurring in an image displayed on a projection plane, the blur being caused primarily by a difference between light paths to a screen surface, diffusion of light thereon, and a performance of a lens used in the projector despite best efforts to focus on a plane screen.

There have been signal processing techniques for eliminating the defocus blur by estimating an amount thereof on the projection plane through inverse filtering computation using a camera and design values so as to project the image corrected by preliminary signal processing performed on the estimated blur amount. For example, PTL 1 proposes techniques that use design values such as the amount of MTF drop of the projector lens (i.e., an amount of blur calculated from the design values of the projector lens).

CITATION LIST

Patent Literature

[PTL 1]
  JP 2008-131099

SUMMARY

Technical Problems

However, the technique for estimating a degree of blur using the design values such as the MTF drop amount have resulted in deviations from the true values due to the installation conditions of the projector and the diffusion of light over the screen surface for example. Also, the measurement by the camera requires using a measuring system in a projector system.

The present disclosure has been devised in view of the above circumstances. An object of the disclosure is therefore to correct a defocus blur easily.

Solution to Problems

According to one aspect of the present technology, there is provided an image processing apparatus including: a blur amount conversion section configured to convert a value of an installation environment condition representing a condition of an environment in which a projector is installed into an amount of blur at a time of projection; and a corrected image generation section configured to generate a corrected image in such a manner that an input image coincides with an output image in accordance with the blur amount converted by the blur amount conversion section.

The value of the installation environment condition of the projector may include a value representing a lens condition of the projector.

The value representing the lens condition of the projector may include at least one of a zoom value, a shift value, or a focus value.

The value of the installation environment condition of the projector may include a value representing a position at which the projector is installed.

The value representing the installation position of the projector may include at least one of a distance of the projector to a projection plane, a pan of the projector, or a tilt of the projector.

The value of the installation environment condition of the projector may include a value representing an interior temperature of the projector.

The value of the installation environment condition of the projector may include information regarding a material of a projection plane of the projector.

The blur amount conversion section may convert the value of the installation environment condition of the projector into the amount of blur at the time of projection in reference to a blur amount database.

The blur amount database may be created beforehand.

The blur amount database may be created by model approximation of the blur amount using a predetermined parameter.

According to one aspect of the present technology, there is provided an image processing method including: by an image processing apparatus, converting a value of an installation environment condition representing a condition of an environment in which a projector is installed into an amount of blur at a time of projection; and generating a corrected image in such a manner that an input image coincides with an output image in accordance with the blur amount.

According to one aspect of the present technology, there is provided a program for causing a computer to function as: a blur amount conversion section configured to convert a value of an installation environment condition representing a condition of an environment in which a projector is installed into an amount of blur at a time of projection; and a corrected image generation section configured to generate a corrected image in such a manner that an input image coincides with an output image in accordance with the blur amount converted by the blur amount conversion section.

According to one aspect of the present technology, the values of the installation environment conditions representing the environment in which a projector is installed are converted into an amount of blur at the time of projection. A corrected image is then generated in such a manner that an input image coincides with an output image in accordance with the converted blur amount.

Advantageous Effects of Invention

According to the present technology, images can be processed. More particularly, the defocus blur can be easily corrected.

BRIEF DESCRIPTION OF DRAWINGS

FIG. 1 is a block diagram depicting a first configuration example of a projector system to which the present technology is applied.

FIG. 2 is an explanatory diagram explaining a projector lens condition acquisition section.

FIG. 3 is an explanatory diagram explaining a defocus blur amount conversion section.

FIG. 4 is an explanatory diagram explaining model approximation involving simple parameters of the defocus blur amount.

DESCRIPTION OF EMBODIMENTS

Figure 5:
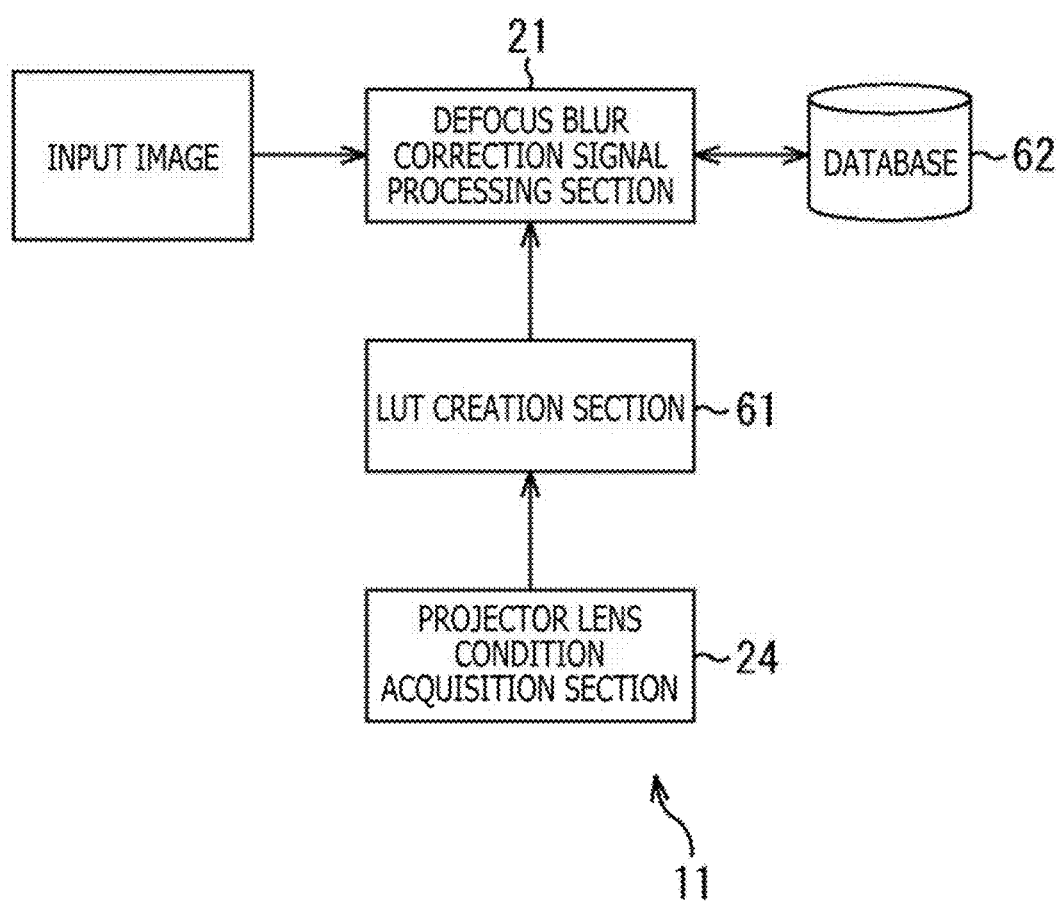
FIG. 5 is a block diagram depicting a configuration example of a projector device in a case in which correction values are to be stored in a database.

Some embodiments for practicing the present technology (referred to as the embodiments) are described below. A description is given under the following headings:
0. Overview
1. First Embodiment
2. Second Embodiment
3. Third Embodiment
4. Fourth Embodiment
5. Computer

0. Overview

Video image display systems involving a projector are often subject to a defocus blur occurring in a video image displayed on a projection plane, the blur being caused primarily by a difference between light paths to a screen surface, diffusion of light thereon, and a performance of a lens used in the projector despite best efforts to focus on a plane screen.

There have been signal processing techniques for eliminating the defocus blur by estimating an amount thereof on the projection plane through inverse filtering computation using a camera and design values so as to project an image corrected by preliminary signal processing performed on the estimated amount of blur.

However, the technique for estimating a degree of blur using the design values such as an MTF drop amount (an amount of blur calculated from the design values of a projector lens) have resulted in deviations from the true values due to the conditions of the projector installation and the diffusion of light over the screen surface for example. Also, a measurement by a camera requires using a measuring system in a projector system.

Meanwhile, the degree of defocus blur varies with different conditions reflecting the environment in which the projector is installed (called the installation environment conditions hereunder), such as projector conditions (mainly lens parameters including zoom, shift, and focus values of the lens), projector installation position, projector interior temperature, and projection plane material.

According to the present technology, at least one of the projector installation conditions of the projector described above is acquired in real time, the acquired value being converted into the amount of blur at the time of projection before generating a corrected image. This provides easy correction of the defocus blur.

What follows is a specific description of the present technology.

1. First Embodiment

<Configuration Examples of the Projector System>

FIG. 1 is a block diagram depicting a first configuration example of a projector system to which the present technology is applied.

The projector system 1 in FIG. 1 includes a projector device 11 and a screen (projection plane) 12. The projector device 11 outputs onto the screen 12 a corrected image obtained by correcting an input image. The screen 12 displays the output image projected by the projector device 11.

The projector device 11 includes a defocus blur correction signal processing section 21, a defocus blur amount conversion section 22, a database 23, a projector lens condition acquisition section 24, a projector 25, and a remote controller 26. The defocus blur correction signal processing section 21, defocus blur amount conversion section 22, database 23, and projector lens condition acquisition section 24 are provided in an LSI.

The defocus blur correction signal processing section 21 generates the corrected image through signal processing in accordance with the amount of defocus blur from the defocus blur amount conversion section 22 in such a manner that the output image coincides with the input image. The defocus blur correction signal processing section 21 outputs the corrected image thus generated to the projector 25.

In accordance with the values of the lens conditions from the projector lens condition acquisition section 24, the defocus blur amount conversion section 22 references the database 23 and thereby sets an appropriate defocus blur amount. The defocus blur amount conversion section 22 supplies the defocus blur amount thus set to the defocus blur correction signal processing section 21.

The database 23 has defocus blur amounts set therein. Multiple defocus blur amounts (spatial projection position and RGB) may be set in the database 23 with respect to a given lens condition value. Incidentally, the database 23 is created beforehand in a factory, for example.

The projector lens condition acquisition section 24 acquires numerically the current lens conditions (zoom/shift/focus) of the projector 25 in real time. The projector lens condition acquisition section 24 supplies the acquired lens condition values to the defocus blur amount conversion section 22.

The projector 25 outputs (projects) the corrected image from the defocus blur correction signal processing section 21 onto the screen 12. The lens conditions of the projector 25 are set by the remote controller 26. The values of the lens conditions thus set are stored into an internal memory of the projector 25.

The example in FIG. 1 described above has the defocus blur correction signal processing section 21, defocus blur amount conversion section 22, database 23, projector lens condition acquisition section 24, and projector 25 configured in the same enclosure constituting the projector device 11. Alternatively, part or all of the defocus blur correction signal processing section 21, defocus blur amount conversion section 22, database 23, and projector lens condition acquisition section 24 may be configured in an enclosure different from the projector 25.

<Description of the Projector Lens Condition Acquisition Section>

The projector lens condition acquisition section is explained next with reference to FIG. 2. FIG. 2 depicts examples of defocus blur reflecting the lens shift conditions during oblique projection by a standard projector.

FIG. 2 illustrates defocus blur variations under different lens shift conditions, with an image at the lens center surrounded by defocused images incurred by upward lens shift, rightward lens shift, downward lens shift, and leftward lens shift.

As depicted in FIG. 2, it is clear that the defocus blur variations are great by angle and by intensity over the entire image. Whereas degrees of the variations are different, the amount of defocus blur varies similarly in terms of zoom and focus values.

The projector lens condition acquisition section 24 acquires numerically the projector lens conditions that vary in this manner.

<Description of the Defocus Blur Amount Conversion Section>

The defocus blur amount conversion section is described next with reference to FIG. 3.

For example, as indicated by A1, a camera 42 captures beforehand a measurement pattern 41 projected by the projector 25. The capture provides measurements of the degrees of defocus blur corresponding to settable projector lens conditions (zoom value 1.0/shift value 1.0/focus value 1.0, . . . , zoom value val_zoom/shift value val_shift/focus value val_focus).

As indicated by A2, the degrees of defocus blur corresponding to the measured settable projector lens conditions are stored into the database 23. It is to be noted that not all settable conditions but representative points alone may be measured and that the intervals between the measured representative points may be filled by linear interpolation at the time of image generation.

For example, the user uses the remote controller 26 to adjust the current projector lens conditions. As a result of this, the projector device 11 sets the current projector lens conditions. The projector lens condition acquisition section 24 acquires numerically the current projector lens conditions thus set. Consequently, as indicated by A3, the defocus blur amount conversion section 22 determines an appropriate degree of defocus blur by referencing the current projector lens conditions and the database 23, and supplies the degree of defocus blur thus determined to the defocus blur correction signal processing section 21. In turn, as indicated by A4, the defocus blur correction signal processing section 21 generates a corrected image reflecting the appropriate degree of defocus blur.

Incidentally, it is possible to reduce the database 23 in size through model approximation of the defocus blur amounts using simple parameters. For example, as depicted in FIG. 4, 66 types of the major axis of defocus blur σa: 0.0:0.2:2.0, of the minor axis of defocus blur σb: 0.0:0.2:2.0, and of the angle of defocus blur θ: −85:5:+90 may be stored only in combinations of their values into the database 23 created in an exhaustive manner. At the time of correcting an image, the degree of its defocus blur may be calculated from the values of σa, σp, and θ.

Alternatively, the database 23 may store not the degrees of defocus blur but the correction values from the start. In this case, as depicted in FIG. 5, the projector device 11 replaces the defocus blur amount conversion section 22 with a LUT creation section 61 that generates an LUT (Look Up Table) of projector lens condition values as well as σa, σb, and θ values. The created LUT is supplied to the defocus blur correction signal processing section 21. Using the LUT, the defocus blur correction signal processing section 21 may obtain correction values from a database 62 in which the correction values are stored beforehand. The defocus blur correction signal processing section 21 may then proceed to correct the input image using the correction values thus obtained.

<Description of the Defocus Blur Correction Signal Processing Section>

Figure 6:
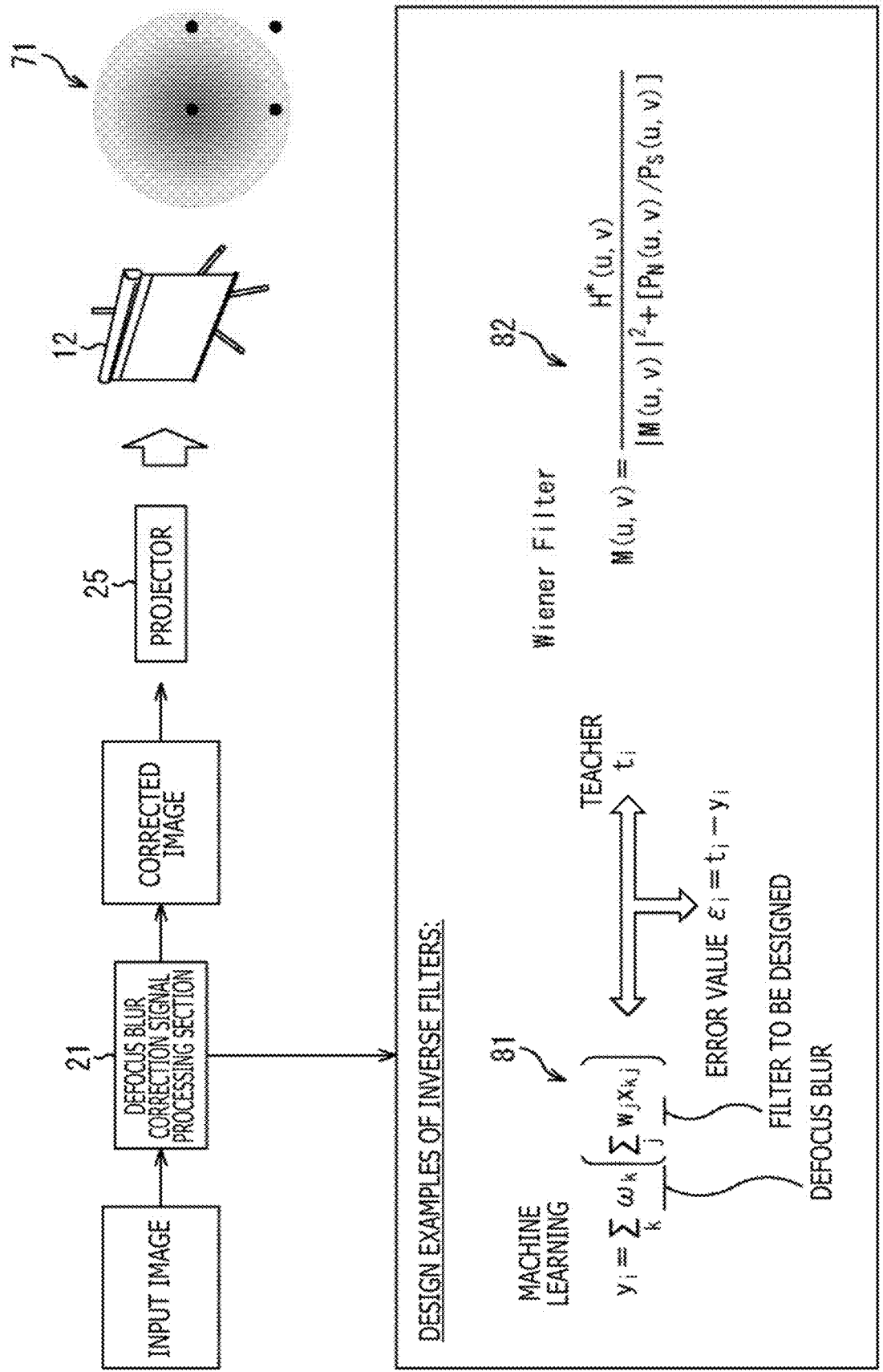
FIG. 6 is another explanatory diagram explaining a defocus blur amount conversion section.

The defocus blur amount conversion section is described next with reference to FIG. 6.

The defocus blur correction signal processing section 21 performs filter signal processing configured with a defocus blur inverse filter on the input image. Two design examples of the inverse filter are cited here: an inverse filter 81 designed by machine learning using an error value $\varepsilon_i = t_i - y_i$, and an inverse filter 82 based on the Wiener Filter. The filters are not limited to the cited examples.

A design example of the inverse filter 81 by machine learning is defined by the following mathematical expression (1):

[Math. 1]

$$y_i = \sum_k \omega_k \left( \sum_j w_j \times k_j \right) \quad (1)$$

$$\varepsilon_i = t_i - y_i$$

where, $t_i$ stands for a teacher, $\omega_k$ for defocus blur, and $W_j$ for the filter to be designed.

The inverse filter 82 based on the Wiener Filter is defined by the following mathematical expression (2):

[Math. 2]

$$M(u, v) = \frac{H^*(u, v)}{|M(u, v)|^2 + [P_N(u, v)/P_S(u, v)]} \quad (2)$$

The inverse filter 81 by machine learning is the more appropriate filter of the two.

The defocus blur correction signal processing section 21 uses the above-described inverse filter to perform the filter signal processing, thereby outputting an output image like the input image which is over-enhanced. The output image is projected onto the screen 12 via the projector 25. At the time of projection onto the screen 12, a defocus blur 71 is added in such a manner as to make the projected image the same as the input image.

<Operation of the Projector System>

Figure 7:
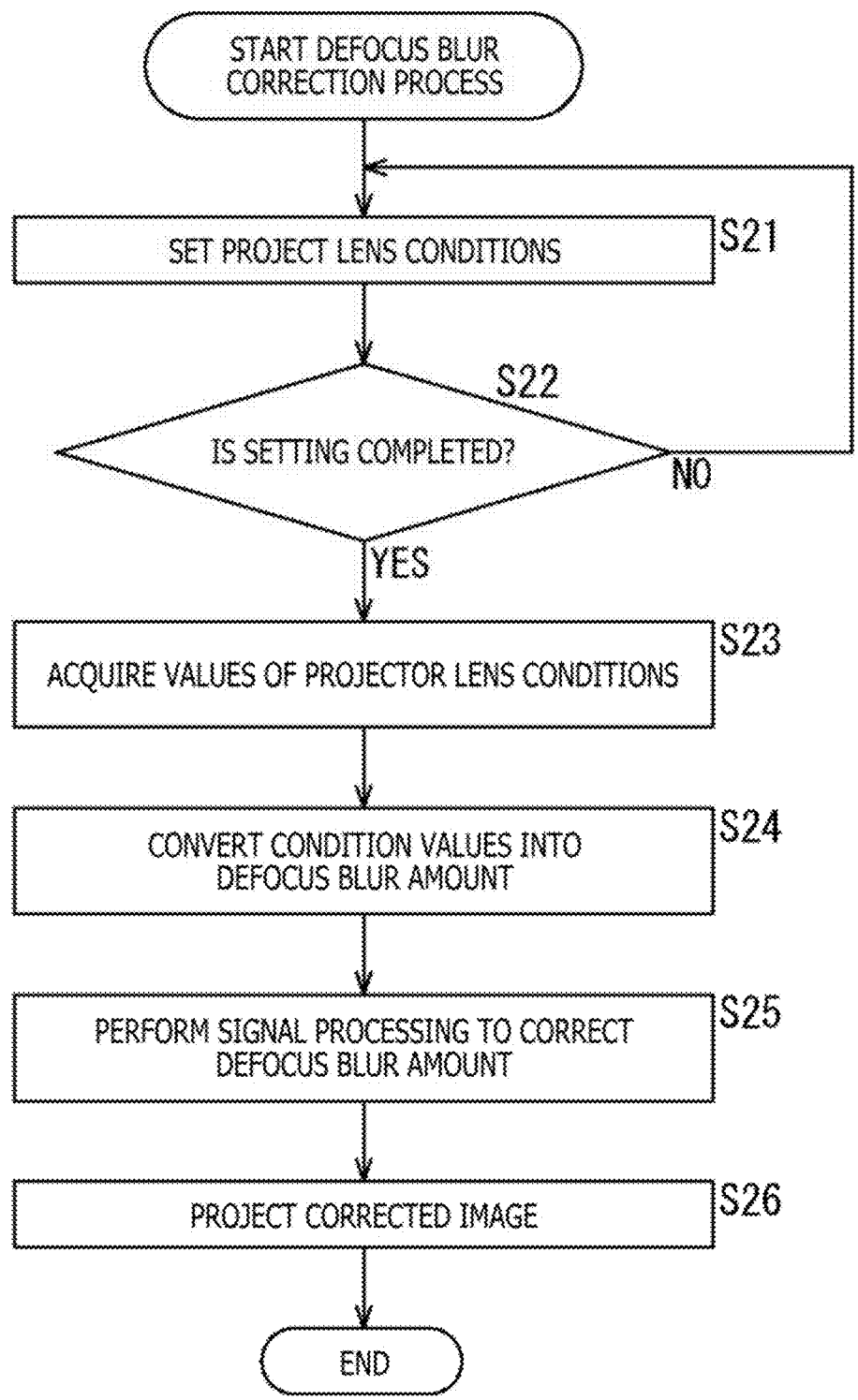
FIG. 7 is a flowchart explaining a defocus blur correction process performed by the projector system in FIG. 1.

Described next with reference to the flowchart of FIG. 7 is a defocus blur correction process performed by the projector system 1 in FIG. 1.

For example, the user uses the remote controller 26 to adjust the current projector lens conditions. In accordance with signals from the remote controller 26, the projector 25 in step S21 sets the current projector lens conditions and stores the set conditions into an internal memory.

In step S22, the projector lens condition acquisition section 24 determines whether or not the setting is completed. If it is determined in step S22 that the setting has yet to be completed, control is returned to step S21, and the subsequent steps are repeated.

If it is determined in step S22 that the setting is completed, control is transferred to step S23. In step S23, the projector lens condition acquisition section 24 acquires the values of the projector lens conditions and supplies the acquired projector lens condition values to the defocus blur amount conversion section 22.

In step S24, the defocus blur amount conversion section 22 references the database 23 to convert the projector lens condition values acquired in step S22 into a defocus blur amount. The defocus blur amount conversion section 22 supplies the defocus blur amount obtained by conversion to the defocus blur correction signal processing section 21.

In step S25, the defocus blur correction signal processing section 21 performs signal processing to correct the defocus blur amount obtained by conversion in step S24 before generating the corrected image. The defocus blur correction signal processing section 21 outputs the corrected image thus generated to the projector 25.

In step S26, the projector 25 projects the corrected image onto the screen 12.

In the manner described above, the present technology permits easy correction of the defocus blur caused by the changing projector lens conditions.

2. Second Embodiment

<Another Configuration Example of the Projector System>

Figure 8:
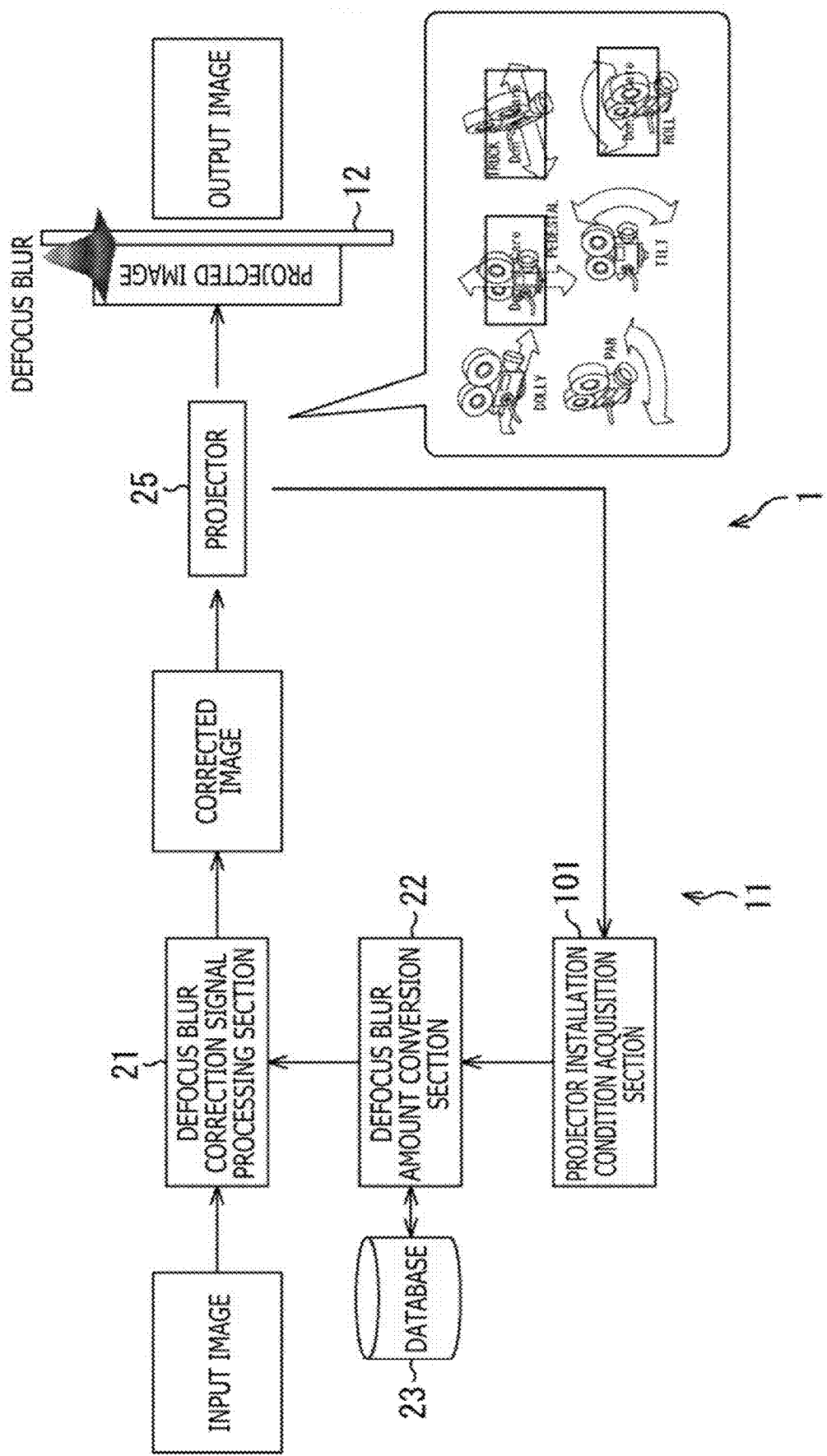
FIG. 8 is a block diagram depicting a second configuration example of the projector system to which the present technology is applied.

FIG. 8 is a block diagram depicting a second configuration example of the projector system to which the present technology is applied.

The projector system 1 in FIG. 8 is configured basically similar to the projector system 1 in FIG. 1. The projector system 1 in FIG. 8 thus includes a projector device 11 and a screen 12.

Similar to the projector device 11 in FIG. 1, the projector device 11 in FIG. 8 includes a defocus blur correction signal processing section 21, a defocus blur amount conversion section 22, a database 23, and a projector 25. The projector device 11 in FIG. 8 differs from the projector device 11 in FIG. 1 in that a projector installation condition acquisition section 101 replaces the projector lens condition acquisition section 24. Although not illustrated, the remote controller 26 is assumed to be provided as in the case of FIG. 1.

That is, the projector installation condition acquisition section 101 acquires in real time the current installation conditions of the projector 25 (projection distance (DOLLY)/PAN/TILT)). The projector installation condition acquisition section 101 supplies the acquired values of the current installation conditions to the defocus blur amount conversion section 22.

For example, the projection distance value is acquired from a ranging sensor attached to the projector 25. The pan and tilt values are acquired from the projector 25 that has the function of obtaining keystone correction values.

Incidentally, the other installation conditions of the projector 25 (vertical position (PEDESTAL)/side-to-side positions (TRUCK)/(ROLL)) are not targeted for correction with this example.

In accordance with the installation condition values of the projector 25 from the projector installation condition acquisition section 101, the defocus blur amount conversion section 22 references the database 23 and sets an appropriate amount of defocus blur accordingly.

<Operation of the Projector System>

Figure 9:
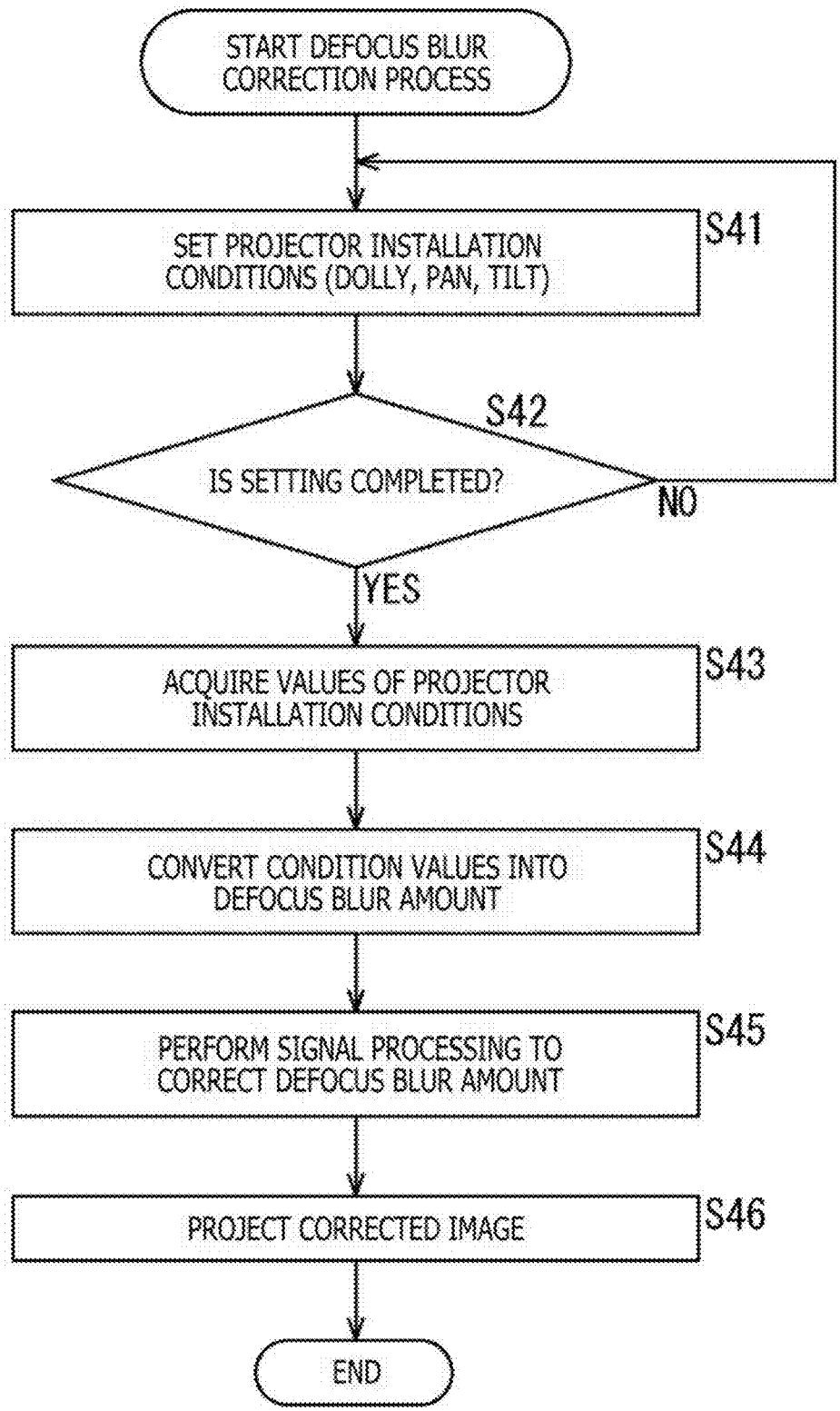
FIG. 9 is a flowchart explaining a defocus blur correction process performed by the projector system in FIG. 8.

Described next with reference to the flowchart of FIG. 9 is the defocus blur correction process performed by the projector system 1 in FIG. 8. Steps S44 to S46 in FIG. 9 are basically similar to step S24 to S26 in FIG. 7, and the explanations of these steps are omitted hereunder to avoid repetitiveness.

For example, the user uses the remote controller 26 to adjust the current installation conditions of the projector 25. In accordance with signals from the remote controller 26, the projector 25 in step S41 sets the current installation conditions of the projector 25 and stores the set conditions into an internal memory.

In step S42, the projector installation condition acquisition section 101 determines whether or not the setting is completed. If it is determined in step S42 that the setting has yet to be completed, control is returned to step S41, and the subsequent steps are repeated.

If it is determined in step S42 that the setting is completed, control is transferred to step S43. In step S43, the projector installation condition acquisition section 101 acquires in real time the current installation conditions of the projector 25 (projection distance (DOLLY)/PAN/TILT)), and supplies the acquired values of the current installation conditions to the defocus blur amount conversion section 22.

In the manner described above, the present technology permits easy correction of the defocus blur caused by the changing projector installation conditions.

3. Third Embodiment

<Another Configuration Example of the Projector System>

Figure 10:
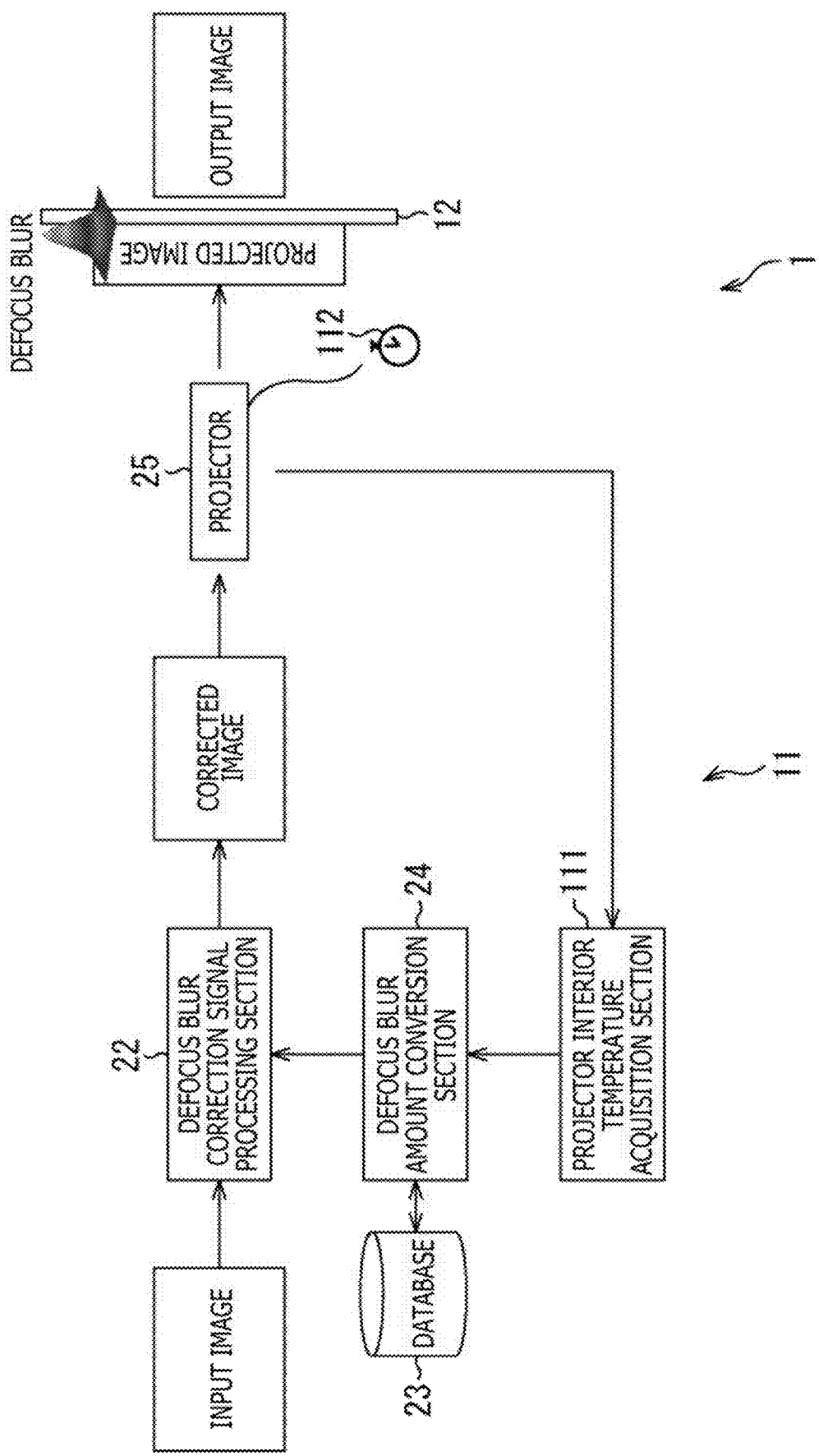
FIG. 10 is a block diagram depicting a third configuration example of the projector system to which the present technology is applied.

FIG. 10 is a block diagram depicting a third configuration example of the projector system to which the present technology is applied.

The projector system 1 in FIG. 10 is configured basically similar to the projector system 1 in FIG. 1. The projector system 1 in FIG. 10 thus includes a projector device 11 and a screen 12.

Similar to the projector device 11 in FIG. 1, the projector device 11 in FIG. 10 includes a defocus blur correction signal processing section 21, a defocus blur amount conversion section 22, a database 23, and a projector 25. The projector device 11 in FIG. 10 differs from the projector device 11 in FIG. 1 in that a projector interior temperature acquisition section 111 replaces the projector lens condition acquisition section 24. In the example of FIG. 10, the projector 25 has an internal timer 112. Although not illustrated, the remote controller 26 is assumed to be provided as in the case of FIG. 1.

That is, the temperature of the projector 25 tends to be the highest when the power is first turned on and to approach an ideal value gradually thereafter. The glass lens of the projector 25 varies in its degree of defocus blur depending on temperature characteristics. Thus, the projector interior temperature acquisition section 111 acquires in real time the current interior temperature of the projector 25 and supplies the acquired interior temperature value to the defocus blur amount conversion section 22. For example, the projector 25 measures time by means of the internal timer 112. Upon elapse of a predetermined time period, the defocus blur correction process is carried out. Although the defocus blur correction process is described here as being performed upon elapse of the predetermined time period, for example, this process may alternatively be carried out immediately after power-on.

In accordance with the interior temperature value of the projector 25 from the projector interior temperature acquisition section 111, the defocus blur amount conversion section 22 references the database 23 and sets an appropriate defocus blur amount accordingly.

<Operation of the Projector System>

Figure 11:
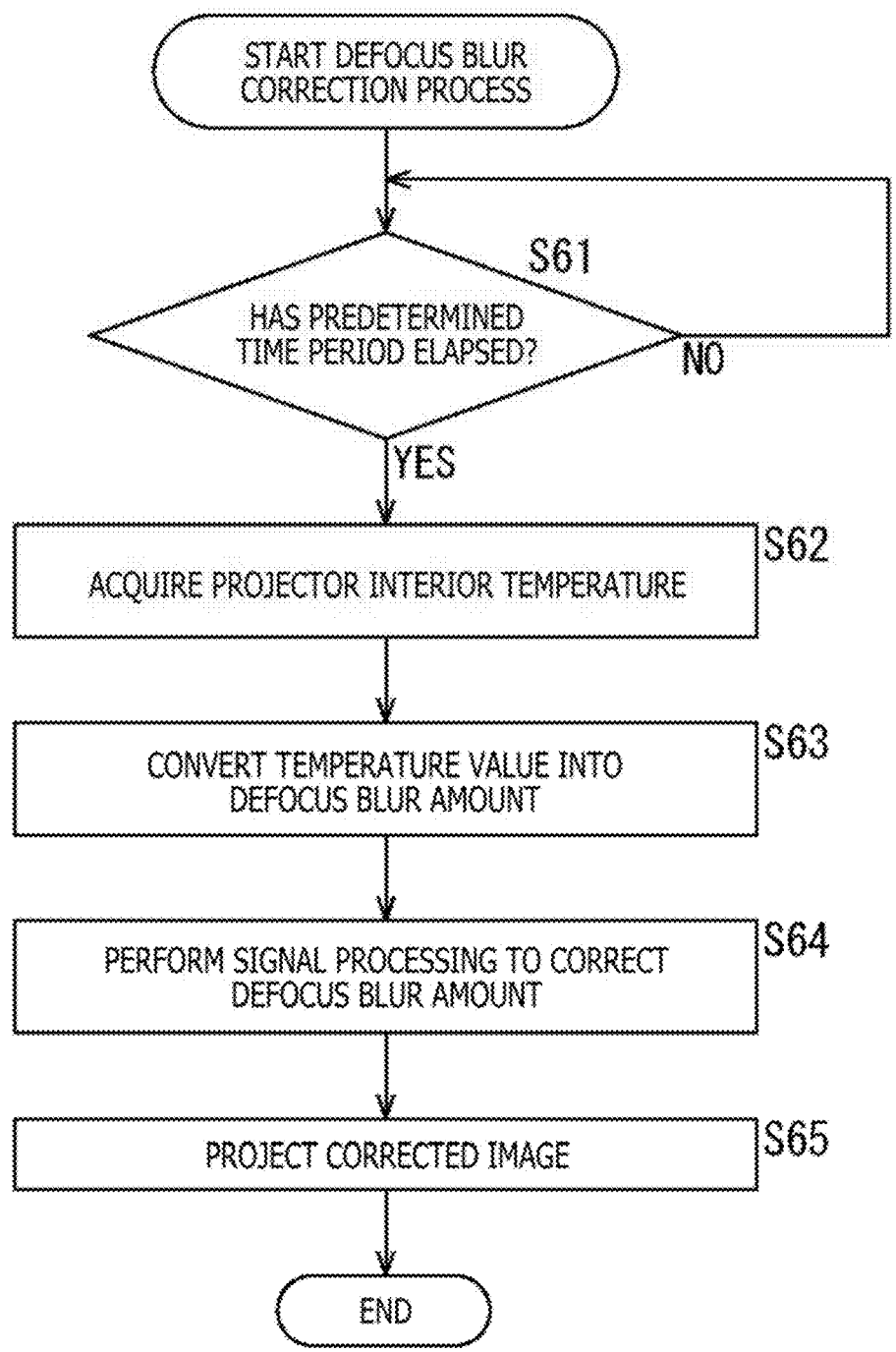
FIG. 11 is a flowchart explaining a defocus blur correction process performed by the projector system in FIG. 10.

Described next with reference to the flowchart of FIG. 11 is the defocus blur correction process performed by the projector system 1 in FIG. 10. Steps S63 to S65 in FIG. 11 are basically similar to step S24 to S26 in FIG. 7, and the descriptions of these steps are omitted hereunder to avoid repetitiveness.

For example, after power in the remote controller 26 is turned on, the projector 25 waits for a predetermined time period to elapse in step S61.

If it is determined in step S61 that the predetermined time period has elapsed, control is transferred to step S62. In step S62, the projector interior temperature acquisition section 111 acquires in real time the value of the current interior temperature of the projector 25, and supplies the acquired value of the current interior temperature to the defocus blur amount conversion section 22.

In the manner described above, the present technology permits easy correction of the defocus blur caused by the changing projector interior temperature.

4. Fourth Embodiment

<Another Configuration Example of the Projector System>

Figure 12:
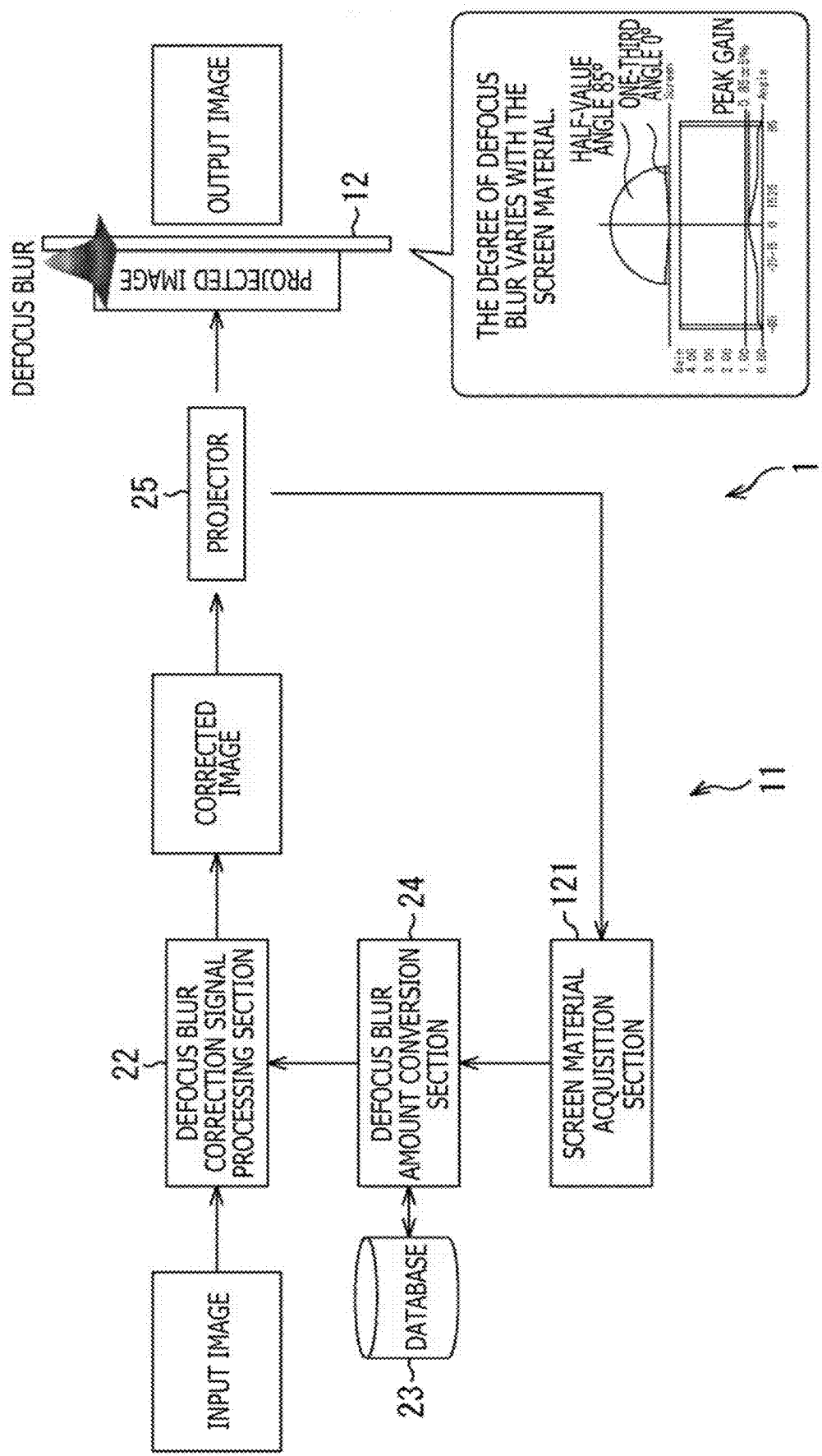
FIG. 12 is a block diagram depicting a fourth configuration example of the projector system to which the present technology is applied.

FIG. 12 is a block diagram depicting a fourth configuration example of the projector system to which the present technology is applied.

The projector system 1 in FIG. 12 is configured basically similar to the projector system 1 in FIG. 1. The projector system 1 in FIG. 12 thus includes a projector device 11 and a screen 12.

Similar to the projector device 11 in FIG. 1, the projector device 11 in FIG. 12 includes a defocus blur correction signal processing section 21, a defocus blur amount conversion section 22, a database 23, and a projector 25. The projector device 11 in FIG. 12 differs from the projector device 11 in FIG. 1 in that a screen material acquisition section 121 replaces the projector lens condition acquisition section 24. Although not illustrated, the remote controller 26 is assumed to be provided as in the case of FIG. 1.

That is, the screen material is set to the projector 25 by means of a UI (User Interface) or the remote controller 26. The degree of defocus blur varies with the screen material as well. The screen materials include glass screens and directional screens. Specifically, some of the screen materials are: 150 PROG Advance screen, bead screen, White Matte Advance screen, White Matte screen, SnoMatte screen, and Magnet Sufton screen. The screen material acquisition section 121 acquires in real time the information regarding the screen material from the projector 25, and supplies the acquired screen material information to the defocus blur amount conversion section 22.

In accordance with the screen material information from the screen material acquisition section 121, the defocus blur amount conversion section 22 references the database 23 and sets an appropriate defocus blur amount accordingly.

<Operation of the Projector System>

Figure 13:
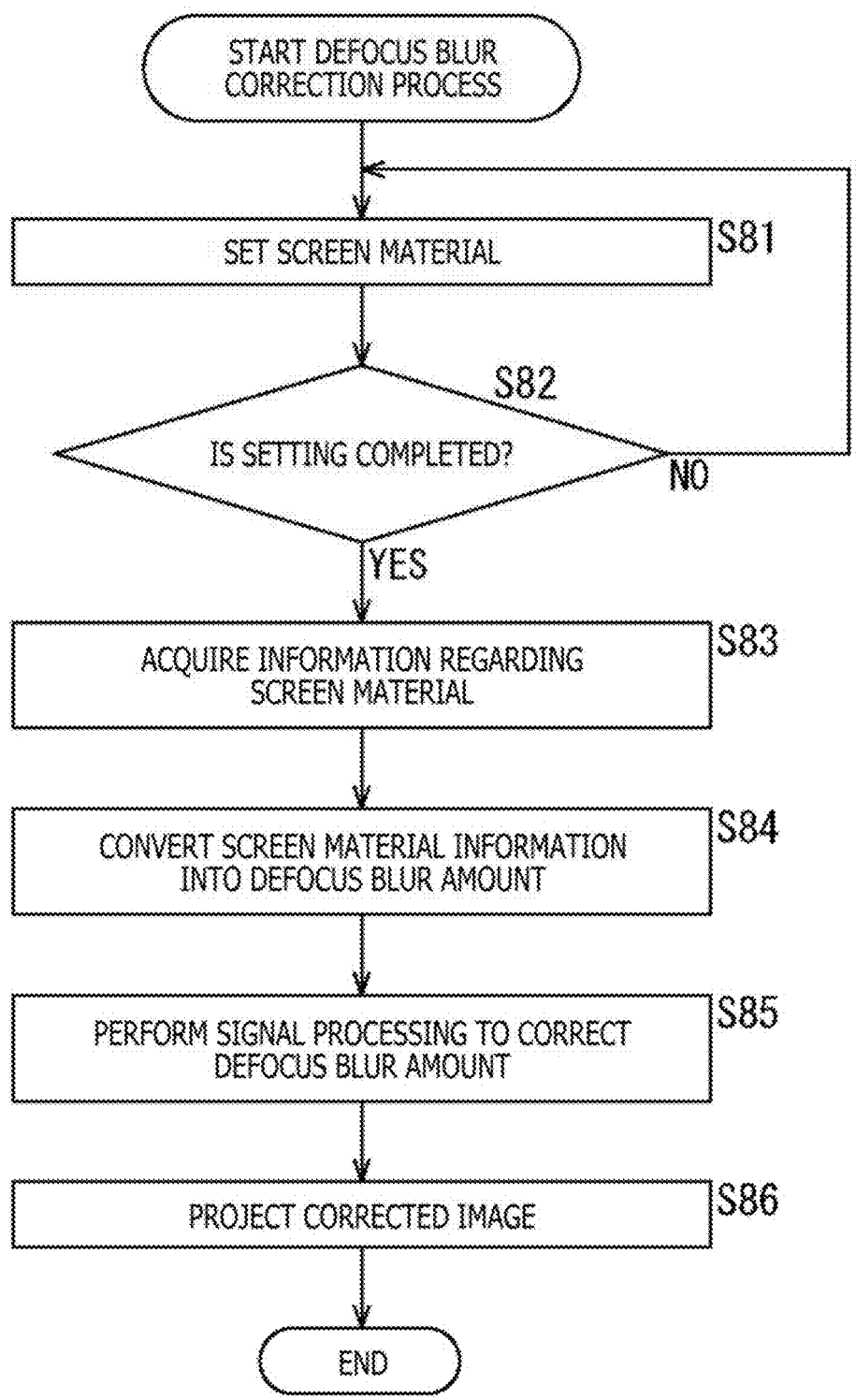
FIG. 13 is a flowchart explaining a defocus blur correction process performed by the projector system in FIG. 12.

Described next with reference to the flowchart of FIG. 13 is the defocus blur correction process performed by the projector system 1 in FIG. 12. Steps S84 to S86 in FIG. 13 are basically similar to step S24 to S26 in FIG. 7, and the descriptions of these steps are omitted hereunder to avoid repetitiveness.

For example, the user uses the remote controller 26 to set the current screen material for the projector 25. In accordance with signals from the remote controller 26, the projector 25 in step S81 sets the current screen material and stores the set screen material into an internal memory.

In S82, the screen material acquisition section 121 determines whether or not the setting is completed. If it is determined in step S82 that the setting has yet to be completed, control is returned to step S81, and the subsequent steps are repeated.

If it is determined in step S82 that the setting is completed, control is transferred to step S83. In step S83, the screen material acquisition section 121 acquires in real time the information regarding the current screen material, and supplies the acquired screen material information to the defocus blur amount conversion section 22.

In the manner described above, the present technology permits easy correction of the defocus blur caused by the changing screen materials for the projector.

Incidentally, whereas the functions of the first through the fourth embodiments have been discussed separately, these functions may be combined in part or in total in a single device.

According to the present technology described above, the image display system involving the projector is configured to correct, through image processing, the defocus blur generated on the projection plane despite the best efforts to focus thereon.

In the case where defocus blur is to be corrected, it is necessary to estimate the amount of the defocus blur. According to the present technology, the information regarding the environment in which the projector is installed (projector lens conditions, projector installation conditions, projector temperature, and screen material) is acquired. The values from the acquired information are then converted into the defocus blur amount. This makes it possible to correct the blur easily without recourse to a measuring system or a complicated UI.

The use of a simple UI also permits correction of the defocus blur that varies with the screen material.

The present technology can be applied to home-use projectors, business-use projectors, and projector products in general.

5. Fifth Embodiment

<Computer>

The series of steps and processes described above may be executed either by hardware or by software. Where the series of steps or processes is to be carried out by software, the programs constituting the software are installed into a suitable computer. Variations of the computer include one with the software preinstalled in its dedicated hardware, and a general-purpose personal computer or like equipment capable of executing diverse functions by the programs installed therein.

Figure 14:
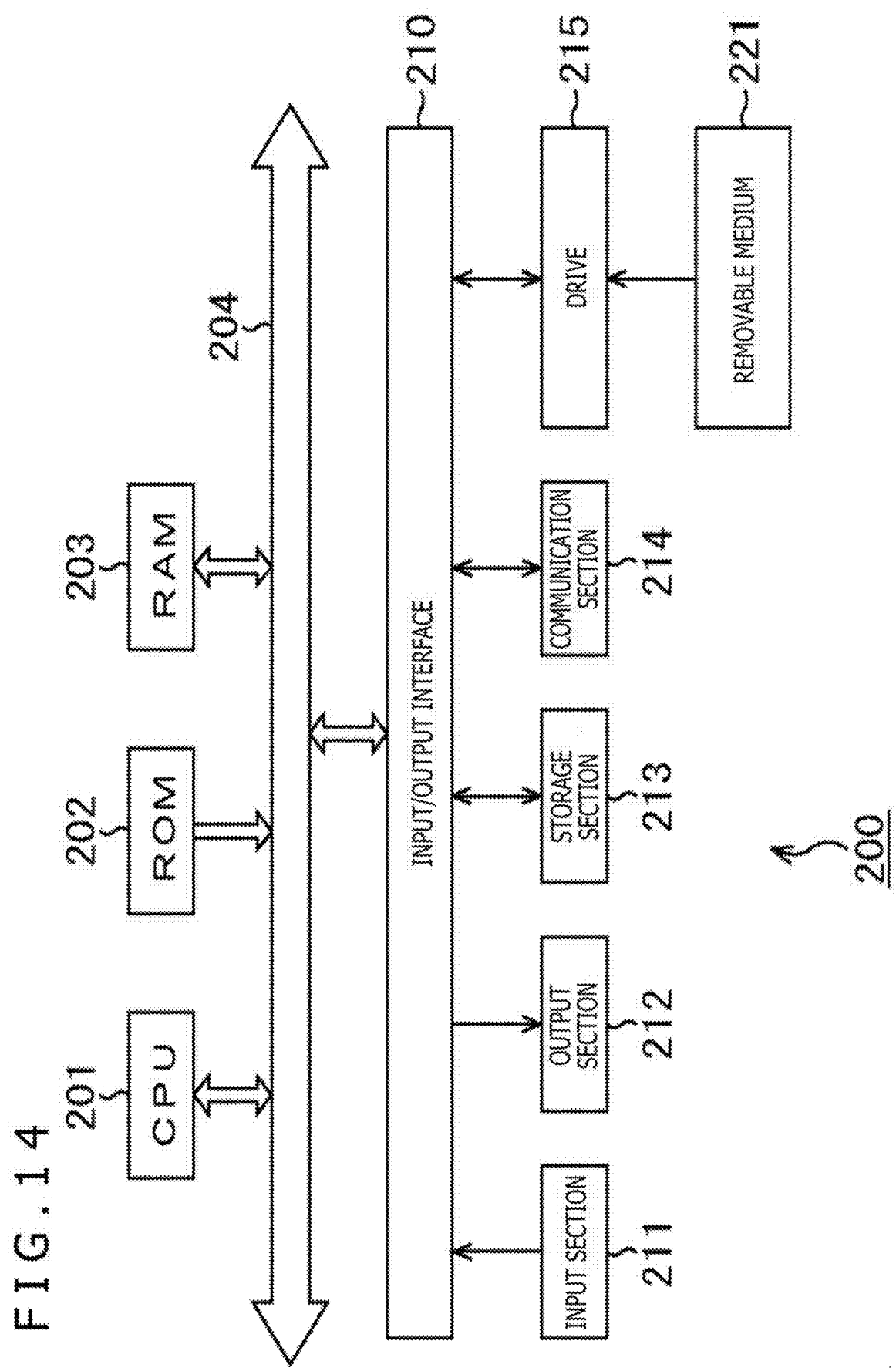
FIG. 14 is a block diagram depicting a principal configuration example of a computer.

FIG. 14 is a block diagram depicting a hardware configuration example of a computer that executes the above-described series of processing using programs.

In a computer 200 depicted in FIG. 14, a CPU (Central Processing Unit) 201, a ROM (Read Only Memory) 202, and a RAM (Random Access Memory) 203 are interconnected via a bus 204.

The bus 204 is also connected with an input/output interface 210. The input/output interface 210 is connected with an input section 211, an output section 212, a storage section 213, a communication section 214, and a drive 215, for example.

The input section 211 includes a keyboard, a mouse, a microphone, a touch panel, and input terminals, for example. The output section 212 includes a display, speakers, and output terminals for example. The storage section 213 includes a hard disk, a RAM disk, and a nonvolatile memory, for example. The communication section 214 includes a network interface, for example. The drive 215 drives a removable medium 221 such as a magnetic disk, an optical disk, a magneto-optical disk, or a semiconductor memory.

In the computer configured as described above, the CPU 201 performs the above-mentioned series of processing by loading appropriate programs from the storage section 213 into the RAM 203 via the input/output interface 210 and the bus 204 and by executing the loaded programs. As needed, the RAM 203 may store data necessary for the CPU 201 to execute diverse processes.

The programs to be executed by the computer (CPU 201) may be recorded on the removable medium 221 serving as a package medium when offered for use. In this case, the programs may be installed into the storage section 213 via the input/output interface 210 from the removable medium 221 attached to the drive 215.

Alternatively, the programs may be offered for use via a wired or wireless communication medium such as local area networks, the Internet, and digital satellite broadcasts. In such cases, the programs may be received by the communication section 214 before being installed into the storage section 213.

As another alternative, the programs may be preinstalled in the ROM 202 or in the storage section 213.

The embodiments of the present technology are not limited to those discussed above. The embodiments may be modified or altered in diverse fashion within the scope and spirit of the present technology.

For example, in this specification, the term "system" refers to an aggregate of multiple components (e.g., devices or modules (parts)). It does not matter whether or not all components are housed in the same enclosure. Thus, a system may be configured with multiple devices housed in separate enclosures and interconnected via a network, or with a single device that houses multiple modules in a single enclosure.

As another example, any configuration described above as one device (or processing section) may be divided into multiple devices (or processing sections). Conversely, the configurations described above as multiple devices (or processing sections) may be unified into one device (or processing section). Also, the configuration of each device (or processing section) may obviously be supplemented with a configuration or configurations other than those discussed above. Furthermore, part of the configuration of a device (or processing section) may be included in the configuration of another device (or processing section), provided the configuration and the operations remain substantially the same for the system as a whole.

As a further example, the present technology may be implemented as a cloud computing setup in which a single function is processed cooperatively by multiple networked devices on a shared basis.

As a still further example, the above-described programs may be executed by any device. In such a case, the device may be configured to have necessary functions (e.g., functional blocks) and be provided with necessary information.

As a yet further example, each of the steps discussed in reference to the above-described flowcharts may be executed either by a single device or by multiple devices on a shared basis. Furthermore, if a single step includes multiple processes, these processes may be executed either by a single device or by multiple devices on a shared basis.

Also, the programs to be executed by the computer may each be processed chronologically, i.e., in the sequence depicted in this specification, in parallel with other programs, or in otherwise appropriately timed fashion such as when the program is invoked as needed. Furthermore, the processes of the steps describing a given program may be performed in parallel with, or in combination with, the processes of other programs.

The multiple elements of the present technology described in this specification may be implemented independently of each other, as long as there occurs no conflict therebetween. Obviously, any multiple elements of the present technology may be implemented in combination. For example, the elements of the present technology discussed in connection with one embodiment may be implemented in combination with the elements of the present technology described in conjunction with another embodiment. Furthermore, any elements of the above-described present technology may be implemented in combination with techniques not discussed above.

The present disclosure may be implemented preferably in the following configurations:

(1) An image processing apparatus including:

a blur amount conversion section configured to convert a value of an installation environment condition representing a condition of an environment in which a projector is installed into an amount of blur at a time of projection; and a corrected image generation section configured to generate a corrected image in such a manner that an input image coincides with an output image in accordance with the blur amount converted by the blur amount conversion section.

(2) The image processing apparatus as stated in paragraph (1) above, in which the value of the installation environment condition of the projector includes a value representing a lens condition of the projector.

(3) The image processing apparatus as stated in paragraph (2) above, in which the value representing the lens condition of the projector includes at least one of a zoom value, a shift value, or a focus value.

(4) The image processing apparatus as stated in paragraph (1) above, in which the value of the installation environment condition of the projector includes a value representing a position at which the projector is installed.

(5) The image processing apparatus as stated in paragraph (4) above, in which the value representing the installation position of the projector includes at least one of a distance of the projector to a projection plane, a pan of the projector, or a tilt of the projector.

(6) The image processing apparatus as stated in paragraph (1) above, in which the value of the installation environment condition of the projector includes a value representing an interior temperature of the projector.

(7) The image processing apparatus as stated in paragraph (1) above, in which the value of the installation environment condition of the projector includes information regarding a material of a projection plane of the projector.

(8) The image processing apparatus as stated in any one of paragraphs (1) to (7) above, in which the blur amount conversion section converts the value of the installation environment condition of the projector into the amount of blur at the time of projection in reference to a blur amount database.

(9) The image processing apparatus as stated in paragraph (8) above, in which the blur amount database is created beforehand.

(10) The image processing apparatus as stated in paragraph (8) or (9) above, in which the blur amount database is created by model approximation of the blur amount using a predetermined parameter.

(11) An image processing method including:
by an image processing apparatus,
converting a value of an installation environment condition representing a condition of an environment in which a projector is installed into an amount of blur at a time of projection; and
generating a corrected image in such a manner that an input image coincides with an output image in accordance with the blur amount.

(12) A program for causing a computer to function as:
a blur amount conversion section configured to convert a value of an installation environment condition representing a condition of an environment in which a projector is installed into an amount of blur at a time of projection; and
a corrected image generation section configured to generate a corrected image in such a manner that an input image coincides with an output image in accordance with the blur amount converted by the blur amount conversion section.

REFERENCE SIGNS LIST

1 Projector system, 11 Projector device, 12 Screen, 21 Defocus blur correction signal processing section, 22 Defocus blur amount conversion section, 23 Database, 24 Projector lens condition acquisition section, 25 Projector, 26 Remote controller, 101 Projector installation condition acquisition section, 111 Projector interior temperature acquisition section, 112 Timer, 121 Screen material acquisition section

The invention claimed is:

1. An image processing apparatus, comprising:
a blur amount conversion section configured to convert a value of an installation environment condition of a projector into an amount of blur at a time of projection, wherein
the installation environment condition indicates a condition of an environment in which the projector is installed, and
the value of the installation environment condition of the projector includes information associated with a material of a projection plane of the projector; and
a corrected image generation section configured to generate a corrected image such that an input image coincides with an output image based on the amount of blur.

2. The image processing apparatus according to claim 1, wherein the value of the installation environment condition of the projector includes a lens value that indicates a lens condition of the projector.

3. The image processing apparatus according to claim 2, wherein the lens value includes at least one of a zoom value, a shift value, or a focus value.

4. The image processing apparatus according to claim 1, wherein the value of the installation environment condition of the projector includes a position value that indicates a position at which the projector is installed.

5. The image processing apparatus according to claim 4, wherein the position value indicates includes at least one of a distance of the projector to the projection plane, a pan of the projector, or a tilt of the projector.

6. The image processing apparatus according to claim 1, wherein the value of the installation environment condition of the projector includes a temperature value that indicates an interior temperature of the projector.

7. The image processing apparatus according to claim 1, wherein the blur amount conversion section is further configured to convert the value of the installation environment condition of the projector into the amount of blur at the time of projection in reference to a blur amount database.

8. The image processing apparatus according to claim 7, wherein the blur amount database is created before the conversion of the value of the installation environment condition.

9. The image processing apparatus according to claim 8, wherein the blur amount database is created by model approximation of the amount of blur based on a parameter.

10. An image processing method, comprising:
in an image processing apparatus,
converting a value of an installation environment condition of a projector into an amount of blur at a time of projection, wherein
the installation environment condition indicates a condition of an environment in which the projector is installed, and
the value of the installation environment condition of the projector includes information associated with a material of a projection plane of the projector; and
generating a corrected image such that an input image coincides with an output image based on the amount of blur.

11. A non-transitory computer-readable medium having stored thereon computer-executable instructions that, when executed by an image processing apparatus, cause the image processing apparatus to perform operations, the operations comprising:
converting a value of an installation environment condition of a projector into an amount of blur at a time of projection, wherein
the installation environment condition indicates a condition of an environment in which the projector is installed, and
the value of the installation environment condition of the projector includes information associated with a material of a projection plane of the projector; and
generating a corrected image such that an input image coincides with an output image based on the amount of blur.

* * * * *